United States Patent
Gomez Cordon et al.

(10) Patent No.: US 12,441,851 B2
(45) Date of Patent: Oct. 14, 2025

(54) METHOD FOR GRANTING TO ORGANIC POLYMERS THE POSSIBILITY OF BEING DETECTED

(71) Applicant: AVANZARE INNOVACION TECNOLOGICA S.L., Navarrete (ES)

(72) Inventors: Julio Gomez Cordon, Logroño (ES); Javier Perez Martinez, Lardero (ES); Luis Otaño Jimenez, Logroño (ES)

(73) Assignee: AVANZARE INNOVACION TECNOLOGICA S.L., Navarrete (ES)

( * ) Notice: Subject to any disclaimer, the term of this patent is extended or adjusted under 35 U.S.C. 154(b) by 1055 days.

(21) Appl. No.: 17/292,554

(22) PCT Filed: Feb. 3, 2020

(86) PCT No.: PCT/ES2020/070076
§ 371 (c)(1),
(2) Date: May 10, 2021

(87) PCT Pub. No.: WO2020/161373
PCT Pub. Date: Aug. 13, 2020

(65) Prior Publication Data
US 2022/0002503 A1   Jan. 6, 2022

(30) Foreign Application Priority Data
Feb. 4, 2019   (ES) ................ ES201930081

(51) Int. Cl.
| | | |
|---|---|---|
| B29B 7/90 | (2006.01) | |
| B29C 70/88 | (2006.01) | |
| C08J 3/20 | (2006.01) | |
| C09C 3/12 | (2006.01) | |
| B29K 505/12 | (2006.01) | |
| C08K 3/34 | (2006.01) | |
| C08K 9/06 | (2006.01) | |
| C08K 9/10 | (2006.01) | |

(52) U.S. Cl.
CPC ........... *C08J 3/203* (2013.01); *B29B 7/90* (2013.01); *B29C 70/88* (2013.01); *C09C 3/12* (2013.01); *B29K 2505/12* (2013.01); *C08J 2307/00* (2013.01); *C08J 2309/06* (2013.01); *C08J 2311/00* (2013.01); *C08J 2323/06* (2013.01); *C08J 2323/12* (2013.01); *C08J 2327/06* (2013.01); *C08J 2331/04* (2013.01); *C08J 2375/04* (2013.01); *C08J 2377/00* (2013.01); *C08J 2383/08* (2013.01); *C08K 3/34* (2013.01); *C08K 9/06* (2013.01); *C08K 9/10* (2013.01); *C08K 2201/001* (2013.01)

(58) Field of Classification Search
CPC .... C08J 3/203; C08J 2307/00; C08J 2309/06; C08J 2311/00; C08J 2323/06; C08J 2323/12; C08J 2327/06; C08J 2331/04; C08J 2375/04; C08J 2377/00; C08J 2383/08; B29B 7/90; B29C 70/88; C09C 3/12; B29K 2505/12; C08K 3/34; C08K 9/06; C08K 9/10; C08K 2201/001
See application file for complete search history.

(56) References Cited

U.S. PATENT DOCUMENTS

| | | |
|---|---|---|
| 5,036,210 A | 7/1991 | Goodman |
| 2005/0042340 A1 | 2/2005 | May et al. |
| 2016/0172086 A1* | 6/2016 | Habu .................. H01F 1/26 |
| | | 428/206 |
| 2019/0237227 A1* | 8/2019 | Wang .................. B29C 67/24 |

FOREIGN PATENT DOCUMENTS

| | | |
|---|---|---|
| EP | 0038730 | 10/1981 |
| EP | 2929941 | 10/2015 |

OTHER PUBLICATIONS

International Search Report and Written Opinion issued in Corresponding PCT application No. PCT/ES2020/070076, dated Apr. 2, 2020 (English Translation provided).

* cited by examiner

*Primary Examiner* — Jiangtian Xu
(74) *Attorney, Agent, or Firm* — NORTON ROSE FULBRIGHT US LLP

(57) ABSTRACT

The present invention relates to a novel method for conferring to thermoplastic, thermostable polymers or elastomers, magnetic, electromagnetic, electrical, X-ray shielding or density properties that allow the detection of said polymers by means of specific equipment that exists in the prior art. The detection of the thermoplastic polymers, thermostable polymers or elastomers in turn facilitates their location, removal or separation. The method is based on the addition of specific iron and silicon alloys with or without surface treatment.

14 Claims, No Drawings

METHOD FOR GRANTING TO ORGANIC POLYMERS THE POSSIBILITY OF BEING DETECTED

CROSS-REFERENCE TO RELATED APPLICATIONS

This application is a national phase under 35 U.S.C. § 371 of International Application No. PCT/ES2020/070076, filed Feb. 3, 2020, which claims the benefit of priority to Spanish Patent Application No. P201930081, filed Feb. 4, 2019, the entire contents of each of which are hereby incorporated by reference in their entirety.

TECHNICAL FIELD

The present invention relates to a method for making plastic polymers or elastomers readily detectable by means of magnetic, electromagnetic, electrical or X-ray systems.

BACKGROUND OF THE INVENTION

To date, magnetic, electromagnetic, electrical, X-ray or density-based detection applied to plastic polymers or elastomers is of interest for a number of reasons as it allows:

Food and pharmaceutical product manufacturers to be able to reduce the risk of contamination of such products due to the presence of plastics, elastomers or fragments thereof originating from packages, intermediate containers, conveyor belts, handling gloves, films or others.

Manufacturers of pipes for optical fiber or fluid transport pipes by means of the use of plastics or elastomers to be able to confer the property of facilitating the detection of these tubes when repairs therein are needed.

Any manufacturer of plastics or elastomers to facilitate their recycling by separation of different types of plastics or of these and other components based on the possibility of magnetic, electromagnetic, electrical, X-ray or density-based detection of plastics or elastomers to be separated.

For conferring these functions to plastics or elastomers, fillers are added to them, said fillers being based on:

Metals such as iron, pulverized austenitic steels, 410SST or 17-4 stainless steel, such as in U.S. Pat. Nos. 6,113,482 and 6,177,113.

Metallic ferrites, including magnetic iron oxide, such as in patents WO1992008923A1, WO2007012898A1, WO2006026823A1, DE4321612A1, JPH02166059A or US 2007/0205529 A1.

Anti-ferromagnetic metal oxides such as MnO, FeO or MnS.

The addition of iron compounds or other metals such as oxides or others means that these compounds are not very effective in regards to their possibility of magnetic or electrical detection, which requires the addition of large amounts of the iron compound for obtaining the detection effect and this in turn implies the loss of physical properties, mechanical properties or the possibility of coloring thereof.

Moreover, the use of metallic steel or iron implies that the added metal is not stable over time because it oxidizes due to the action of oxygen in the air, contaminating the plastic or object to which it has been added, or causing said plastic or object to lose its physical or mechanical properties, thereby rendering it useless for the purpose for which it was built.

The use of iron alloys commonly referred to as stainless steels prevents the problem of oxidation of the metal added to the polymer, but, in contrast, as the iron has been alloyed with sufficient amounts of chromium or nickel, the resulting alloy loses magnetic properties and, again, large amounts of said alloy need to be added to the polymer to achieve the magnetic detection effect.

OBJECT OF THE INVENTION

The object of the present invention is to confer to plastics and elastomers the possibility of being detected, located, removed or separated by magnetic, electromagnetic, electrical means, by means of X-rays or by density, by means of a method based on the addition of iron and silicon alloys prepared specifically for this purpose.

DESCRIPTION

The polymers, whether they are thermoplastic polymers, thermostable polymers or elastomers, can be detected by means of the use of magnetic, electromagnetic, electrical, X-rays or density-based detection equipment when they contain materials that are able to cause an effect or change on the chosen detection system. The polymers can also be located, removed or separated. Methods for the detection of metallic materials are based on several types of different technologies.

The first type of metal detectors use a balanced coil detection head. Detectors of this type can detect any type of metallic contamination, including ferrous metals, non-ferrous metals and stainless steels by means of the electromagnetic and electrical effect metals cause on the detection system.

The second type of detector uses permanent magnets assembled on a detection head for detecting magnetic stainless steels or ferrous metals by means of the magnetic and electromagnetic effect metals of this type cause on the detection system.

The third group of technologies currently used for the detection, location, removal or separation of metallic materials is inspection by X-rays which detects the shielding of these rays produced by high-density materials, metallic materials being included among them.

Lastly, it is possible to detect, differentiate and/or separate polymer materials by the increase in density in the mass of the object or fragment produced by the addition of high-density material thereto.

The detection of polymers or fragments thereof is the initial phase which facilitates or allows their removal, location, repair, separation, recycling or recovery, among others.

The problem with adding iron metal alloys to plastics is the reduction of the service life thereof due to the fact that the iron metal alloys oxidize in very short periods of time, therefore the manufactured object containing said alloys ends up being rendered useless.

The addition of stainless steels has the problem that they have less effect on detection systems because they have worse magnetic properties for their detection.

It has surprisingly been demonstrated that by means of applying a specific method, it is possible to confer to thermoplastic, thermostable polymers or elastomers the property of being detectable by means of magnetic, electrical, X-ray or density-based methods by adding to the polymer iron and silicon alloys, which maintain magnetic properties, which means that the amount that needs to be added to achieve the detection of the assembly is very low, and furthermore these iron and silicon alloys do not oxidize or are not transformed into other products throughout the service life of the polymer to which they have been added.

Iron and silicon alloys providing the detection effect by magnetic, electromagnetic, electrical means, X-ray or density-based means are:

Those having a silicon content in alloys with iron which can range between 0.2% and 75%, preferably between 5% and 50% and more preferably between 12 and 20%.

Furthermore, the iron and silicon alloys can contain other chemical elements in maximum proportions equal to the silicon content in the alloy such as Cr, Ni, Co, Mo, Ti, Al, Mg, Ca, Sr, Ba, B, C, P, S, Cu, Zn, Zr, Nb, Sn, Ta, W, Bi, Ce, La, rare earths and mixtures thereof.

The manufacture of iron and silicon alloys is performed by means of:

Primary methods which are those that are based on the reduction of mixtures of iron and silicon compounds, mainly oxides of these elements, which are generally treated by thermal and carbon reduction action in a furnace. In addition to these two main components, they may contain other components.

Secondary methods when using metal iron or its alloys to which metal silicon, or its alloys, and the remaining components, if there are any, are added for finally melting everything that will form the alloy.

Both through primary methods and secondary methods it is possible to achieve an iron and silicon contents in the final alloy within the range of the contents proposed herein, in addition to achieving the presence of other secondary components such as Cr, Ni, Co, Mo, Ti, Al, Mg, Ca, Sr, Ba, B, C, P, S, Cu, Zn, Zr, Nb, Sn, Ta, W, Bi, Ce, rare earths and mixtures thereof.

The shape of the material added to the polymer can be spherical, prismatic, in the form of wires, planar or irregular.

The size of the materials to be added ranges between 10 nm and 5 mm, preferably between 1 μm and 300 μm and more preferably between 30 μm and 110 μm, although the size thereof will depend on the processing of the polymer. Thus, for example, for a spinning or filament, the size of the materials will range between 10 nm and 10 μm.

The amount iron and silicon alloy needed to be added to the polymer for the proposed materials can range between 0.1% and 95%, preferably between 1.5% and 50% and more preferably between 3% and 20%.

To obtain suitable mechanical qualities in the end product and reduce the risk of corrosion of the iron alloys having a silicon content of the present invention, the proposed materials can receive a surface or functionalization treatment prior to or during the mixing thereof based on the use of silane-type coupling agents known in the state of the art. The silanes to be used can be one or a mixture of the following silanes:

vinylsilanes including silanes of formula:

$$A\text{-}Si(R^2)_x(OR^1)_{3-x} \tag{1}$$

wherein $R^1$, as well as $R^2$, independently from one another, represent a linear or branched alkyl group with 1 to 4 carbon atoms, and $R^1$ generally represents methyl and/or ethyl, and x is equal to 0 or 1, and A represents a functional vinyl or propyl vinyl group. Examples of silanes of this type can be: vinyltrimethoxysilane, vinyltriethoxysilane, vinyltripropoxysilane, vinyltriisopropoxysilane, vinyltributoxysilane, vinyltriisobutoxysilane, vinylacetoxysilane, vinyltriisobutoxysilane, vinylbutyltrimethoxysilane, vinylmethyltrimethoxysilane, vinyletylltrimethoxysilane, vinylpropyltrimethoxysilane, vinylbutyltriethoxysilane and vinylpropyltriethoxysilane.

Aminosilanes including silanes of formula:

$$A\text{-}Si(R^2)_x(OR^1)_{3-x} \tag{2}$$

wherein $R^1$, as well as $R^2$, independently from one another, represent a linear or branched alkyl group with 1 to 4 carbon atoms, and $R^1$ generally represents methyl and/or ethyl, and x is equal to 0 or 1, and A represents an amino functional group of formula 2a $$-(CH_2)_f-[NH(CH_2)_g]_gNH[(CH_2)_{f*}NH]_{g*}-(CH_3) \tag{2a}$$

wherein i, f, f*, g or g* are identical or different, with i=1, 2, 3 or 4, f and/or f*=1 or 2, g and/or g*=0 or 1, preferably with i equal to 3, as well as g and g* equal to 0.

Bis-aminosilanes including silanes of formula:

$$(OR_1)_3Si\text{-}A\text{-}Si(OR_1)_3 \tag{3}$$

wherein the $R^1$ groups are identical or different and $R^1$ represents a linear or branched alkyl group with 1 to 4 C atoms and preferably $R^1$ represents methyl and/or ethyl, as well as, optionally, at least another silicon compound of the series consisting of tetraalkoxysilane, alkylalkoxysilane, mercaptoalkylalkoxysilane, aminoalkylalkoxysilane, carboxyalkylalkoxysilane, ureidoalkylalkoxysilane, thiocyanatealkylalkoxysilane and silica sols, and A represents a bis-amino functional group of formula 3a.

$$-(CH_2)_f-[NH(CH_2)_g]_gNH[(CH_2)_{f*}NH]_{g*}-(CH_2)_{i*}- \tag{3a}$$

wherein i, i*, f, f*, g or g* are identical or different, with i and/or i*=1, 2, 3 or 4, f and/or f*=1 or 2, g and/or g*=0 or 1, preferably with i and i* equal to 3, as well as g and g* equal to 0. Examples of this type of silane can be: bis-(trimethoxysilylpropyl)amine, bis-(triethoxysilylpropyl)amine, bis-(triethoxysilylpropyl)ethylene diamine, N-[2-(vinylbenzylamino)ethyl]-3-aminopropyltrimethoxy silane, and aminoethyl-aminopropyltrimethoxy silane.

Silanes with epoxy or glycidoxy functional groups with formula:

$$A\text{-}Si(R^2)_x(OR^1)_{3-x} \tag{4}$$

wherein A represents a 2-(3,4-epoxycyclohexyl)ethyl, 1-glycidyloxymethyl, 2-glycidyloxyethyl, 3-glycidyloxypropyl or 3-glycidyloxyisobutyl group, $R^1$, as well as $R^2$, independently from one another, represent a linear or branched alkyl group with 1 to 4 carbon atoms and preferably $R^1$ represents methyl and/or ethyl, and x is equal to 0 or 1. For example 3-glycidyloxypropyltrimethoxysilane.

Bisilanes with sulfide functional groups:

$$(OR^1)_3Si\text{-}A\text{-}Si(OR^1)_3 \tag{5}$$

wherein the $R^1$ groups are identical or different and $R^1$ represents a linear or branched alkyl group with 1 to 4 C atoms and preferably $R^1$ represents methyl and/or ethyl, as well as, optionally, at least another silicon compound of the series consisting of tetraalkoxysilane, alkylalkoxysilane, mercaptoalkylalkoxysilane, aminoalkylalkoxysilane, carboxyalkylalkoxysilane, ureidoalkylalkoxysilane, thiocyanatealkylalkoxysilane and silica sols, and A represents a polysulfide group (5a):

$$-(S)_i- \tag{5a}$$

wherein i can take values of 1 to 10.

Silanes with various functional groups such as:

$$A\text{-}Si(R^2)_x(OR^1)_{3-x} \tag{6}$$

wherein A represents a mercaptopropyl, thiocyanatepropyl, ureidopropyl, isocyanatepropyl, methacryloxypropyl, acryloxypropyl( . . . ) group, and $R^1$, as well as $R^2$, independently from one another, represent a linear or branched alkyl group with 1 to 4 carbon atoms and preferably $R^1$ represents methyl and/or ethyl, and x is equal to 0 or 1.

Silanes with alkyl chains including:

$$A\text{-}Si(R^2)_x(OR^1)_{3-x} \qquad (7)$$

wherein R1, as well as R2, independently from one another, represent a linear or branched alkyl group with 1 to 4 carbon atoms, and R1 generally represents methyl and/or ethyl, and x is equal to 0 or 1, and A represents a linear or branched alkyl group with 1 to 50 carbon atoms, a cycloalkyl group which can be branched, a phenyl group or a phenylalkyl group with linear or branched alkyl chains between 1 to 50 carbon atoms.

Bisilanes with alkyl chains:

$$(OR^1)_3Si\text{-}A\text{-}Si(OR^1)_3 \qquad (8)$$

wherein the $R^1$ groups are identical or different, and $R^1$ represents a linear or branched alkyl group with 1 to 4 C atoms and preferably $R^1$ represents methyl and/or ethyl and A represents an alkyl chain with 1 to 50 carbon atoms. An example of silanes of this type can be bis-triethoxysilylethane (BTSE).

The ratio of silane to be added by mass/mass percentage to the silicon containing iron alloy can be between 0.01 and 10% of silane. Preferably between 0.1 and 3%, and more preferably between 0.2 and 2%.

The preparation of the silanized materials is carried out before or during any mixing process in which the iron and silicon alloy is involved.

The addition of silane to the iron and silicon alloy before mixing the material with the organic polymer is carried out by means of methods known in the state of the art and based on treatments in aqueous liquid medium or organic solvent such as alcohols, ketones, the mixtures thereof and/or the mixtures thereof in water containing between 1 and 90% silane, and they may furthermore contain additives for catalyzing the silanization reaction of the surface of the magnetic material, for example those producing an acid pH, a basic pH or which are Lewis acids or bases, such as acetic acid, tin acetate or ammonia, among others. After performing the treatment, the obtained product is dried between room temperature and 200° C., at atmospheric pressure or under vacuum, to remove the liquid media and byproducts, catalysts and additives used in surface silanization.

The surface coating of the magnetic material of this invention can also be performed by means of adding silanes in gaseous phase by means of methods such as physical vapor deposition (PVD), plasma-enhanced chemical vapor deposition (CVD) and other methods known in the state of the art for the functionalization of other inorganic or metallic materials.

For coating the surface of the material it is also possible to directly add silane to the base organic polymer, and the magnetic material is simultaneously or subsequently added, the process continuing with the mixture of everything for obtaining the active organic polymer, producing silanization of the surface in the polymer itself.

Once the surface of the material has been coated with silane, by means of this silane coupling to the organic polymer occurs by means of the formation of covalent bonds, dipole, self-assembly, electrostatic or Van der Waals forces.

The polymers to which the iron and silicon alloys proposed in this invention can be added for conferring to the same the possibility of being detected are: polyolefins of any type such as polyethylene, polypropylene, polybutylene, co-polymers with different monomers, EVA co-polymers, ethylene-butylmethacrylate or others, polystyrenes, PVC and vinyl plastics, PET, polymethacrylates, polyacrylates, polyamides, PLA, PVDF, Teflon®, polycarbonates, ABS, polyurethanes, natural rubber, SBR, NBR, chloroprene, EPDM, polybutadiene, butyl rubbers, silicones, acrylic rubbers, ionomers, latex, epoxy resins, unsaturated polyester, epoxy vinyl ester, gel coats of the two aforementioned components, acrylic gel coats, polyurethane gel coats, polyurethane resins, polyurea resins, urea-formaldehyde, melamine-formaldehyde, phenol-formaldehyde, mixtures thereof and other organic polymers.

The process of adding the materials to the organic polymers includes several possibilities:

Mixture of solid powders, which can be obtained by means of the mixing of the material of this invention with polymer powders having a size between 10 nm and 10 mm by means of convective movement, scatter mixing or shear mixing. Mixing by convective movement consists in completely inverting the powder bed, in the case of turning mixers, or it can be done by driving by means of a propeller, an endless screw or other techniques. Scatter mixing can be performed by applying vibrational movement to powders. Shear mixing can be performed during the grinding of the organic polymer, to which the material of this invention is added. These processes are known in the state of the art and are performed in a batch-wise manner or continuously. The obtained mixture of solids can then be used for molding or be melt or cold extruded to obtain polymer pellets.

Mixing, in which the material of this invention is added to a molten solid, comprises, among others:

Inclusion of the material of this invention in the organic polymer directly by means of melting the polymer and mixture, referred to in the state of the art as melt extrusion or mixing. The polymer can be melted by means of heating in a single-screw, double-screw, or planetary extruder or an extruder with an internal mixer. Inclusion of the material of this invention in the organic polymer by means of adding the material of this invention in the form of a prior mixture of said material with the same polymer or with other polymers, known in the state of the art as concentrate addition or masterbatch. The melting and final mixing can be performed by means of heating in a single-screw, double-screw, or planetary extruder or an extruder with an internal mixer.

Mixing, in which the solid material of this invention is added to a monomer, is dispersed by stirring, scattering, shearing, vibration, ultrasound or others, and the monomer is simultaneously or subsequently polymerized in situ.

Mixing, in which the solid material of this invention is added to a solid polymer previously dissolved in a solvent. The solid and liquid mixture is dispersed by stirring, scattering, shearing, vibration, ultrasound or others, and the solvent is simultaneously or subsequently removed by vacuum, distillation or any other applicable method in the state of the art for the mixture of inorganic or metallic fillers.

Mixture of the material of this invention or a concentrate or masterbatch thereof with the solid organic polymer in a mixer closed by loading such as a Banbury mixer, Sigma mixer or the like, known in the state of the art for mixing inorganic or metallic fillers.

Mixture of the material of this invention, or a concentrate thereof, with the organic polymer in a roller mill or calender, known in the state of the art for mixing inorganic or metallic fillers.

Mixture of the material of this invention, or a concentrate or masterbatch thereof, with an organic resin having one or two components such as unsaturated polyesters, epoxy vinyl ester, gel coats of these polymers, epoxy resins, polyurethane resins, polyurea resins, urea-formaldehyde, melamine-formaldehyde, phenol-formaldehyde in which the components thereof are liquid or pasty components and are mixed by any dispersion or mixing method such as stirring, vibration, ultrasound or others.

Any other method of the state of the art which allows a solid material to be added to an organic polymer, whether it is solid or liquid.

Once the material of this invention has been added to the organic polymer, shape can be imparted to the final manufactured object using any technique from the state of the art for obtaining objects from organic polymers such as injection, extrusion, coextrusion, manufacture of fibers, rotational molding, pressing, hot plate pressing, open molding, casting, sintering, film, manufacture of fibers, SMC, BMC, rolling or other methods known in the state of the art.

The final polymers may contain those other additives needed in the manufacture thereof as antioxidants, UV protectors, plasticizers, anti-static agents, electrical conductors, antiblocking agents, accelerators, catalysts, thermal stabilizers, flame retardants, mineral or organic fillers or other additives, according to the properties required of the final polymer, which may be added before, during or after the mixing with the material conferring the detection property.

Furthermore, detectable plastics, both thermoplastic and thermostable plastics, or elastomers can contain variable amounts of different pigments and colorants for imparting color to the plastic or elastomer, which may be added before, during or after the mixing with the material conferring the detection property.

For the purpose of improving the mechanical and resistance properties of the proposed final polymers, it is possible to add to them coupling agents such as polyethylene-maleic acid, polypropylene-maleic acid, polyethylene-acrylic acid and/or other polymers known in the state of the art for improving the dispersion of solid fillers in plastics or generating bonds between the solid filler and the polymer.

The material used for conferring detection properties can be mixed or linked with any of the other additives, fillers or components that the polymer is going to include, prior to the mixing with the polymer.

EXAMPLES

Examples of coating the iron-silicon alloys of the present invention by means of silanes:

Example R1: 1 kg of iron alloy with a silicon content of 15% is used. It is placed in a polyethylene drum with a gas outlet. A mixture of 10 g of vinyltrimethoxysilane, 20 g of water and 1 g of acetic acid is added. The drum is rotated at 25 rpm for 3 hours. The resulting volatile substances are removed by vacuum.

Example R2: 1 kg of iron alloy with a silicon content of 15% is used. It is placed in a polyethylene drum with a gas outlet. A mixture of 10 g of aminopropyltrimethoxysilane and 10 g of water is added. The drum is rotated at 25 rpm for 1 hour. The resulting volatile substances are removed by means of vacuum.

Example R3: 1 kg of iron alloy with a silicon content of 15% is used. It is placed in a polyethylene drum with a gas outlet. A mixture of 10 g of commercial bis[3-(triethoxysilyl)propyl]tetrasulfide Evonik Si-69, 10 g of water and 1 g of acetic acid is added. The drum is rotated at 25 rpm for 3 hours. The resulting volatile substances are removed by means of vacuum.

Examples of Use of the Iron-Silicon Alloys with or without Functionalization or Coating of the Present Invention:

The substrates used mentioned in the following examples are polymer specimens obtained by injection of the corresponding thermoplastic polymer after having added thereto by extrusion the proposed material. The polymers contain 0.2% Irganox 1010 and 0.02% Irgafos 168 antioxidants. Once specimens have been obtained, they are trimmed down to a 2 mm×2 mm×1 mm high square and tested in four types of detectors:

| EXAMPLE NO. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 1 | Low-density polyethylene | — | — | 0% | NO | NO | NO |
| 2 | High-density polyethylene | — | — | 0% | NO | NO | NO |
| 3 | Co-polymer | — | — | 0% | NO | NO | NO |
| 4 | Polypropylene | — | — | 0% | NO | NO | NO |
| 5 | Low-density polyethylene | 15% | 100 μm | 5% | NO | NO | YES |
| 6 | Low-density polyethylene | 15% | 100 μm | 10% | NO | YES | YES |
| 7 | Low-density polyethylene | 15% | 100 μm | 15% | YES | YES | YES |
| 8 | High-density polyethylene | 5% | 100 μm | 3% | NO | NO | YES |
| 9 | High-density polyethylene | 5% | 100 μm | 5% | NO | YES | YES |
| 10 | High-density polyethylene | 5% | 100 μm | 10% | YES | YES | YES |
| 11 | High-density polyethylene | 10% | 100 μm | 3% | NO | NO | YES |
| 12 | High-density polyethylene | 10% | 100 μm | 15% | YES | YES | YES |
| 13 | High-density polyethylene | 15% | 100 μm | 3% | NO | NO | YES |
| 14 | High-density polyethylene | 15% | 100 μm | 10% | NO | YES | YES |
| 15 | High-density polyethylene | 15% | 100 μm | 15% | YES | YES | YES |

-continued

| EXAMPLE NO. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 16 | Polypropylene | 15% | 100 μm | 15% | YES | YES | YES |
| 17 | High-density polyethylene | 50% | 100 μm | 15% | YES | YES | YES |
| 18 | High-density polyethylene | 50% | 100 μm | 80% | NO | NO | YES |
| 19 | High-density polyethylene | 75% | 100 μm | 80% | NO | NO | YES |

The substrates used mentioned in the following examples are polymers obtained by the rotational molding of powders of the corresponding thermoplastic polymer after having added thereto the proposed material. For the addition of the solid, firstly, the polymer is extruded with the iron and silicon alloy powder to obtain pellets which are then ground to a maximum grain size of 150 μm. The polymers contain 0.2% Irganox 1010 and 0.02% Irgafos 168 antioxidants, and blue pigment. Shaping is performed by rotational molding. Once the study specimen has been obtained, it is trimmed down to a 2 mm×2 mm×1 mm high square and tested in four types of detectors:

| Example No. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 20 | High-density polyethylene | 0 | — | 0% | NO | NO | NO |
| 21 | Polypropylene | 0 | — | 0% | NO | NO | NO |
| 22 | High-density polyethylene | 5% | 100 μm | 5% | NO | YES | YES |
| 23 | High-density polyethylene | 5% | 100 μm | 10% | YES | YES | YES |
| 24 | High-density polyethylene | 10% | 100 μm | 10% | YES | YES | YES |
| 25 | High-density polyethylene | 15% | 100 μm | 10% | NO | YES | YES |
| 26 | High-density polyethylene | 15% | 100 μm | 15% | YES | YES | YES |
| 27 | Polypropylene | 15% | 45 μm | 15% | YES | YES | YES |

The substrates used mentioned in the following examples are polymer specimens obtained by injection of the corresponding thermoplastic polymer after having added thereto the proposed material by melt extrusion for obtaining pellets. Once specimens have been obtained, they are trimmed down to a 2 mm×2 mm×1 mm high square and tested in four types of detectors:

| Example No. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 28 | 28% VA EVA | 15% | 100 μm | 15% | YES | YES | YES |
| 29 | 28% VA EVA | Material prepared according to Example R2 | 100 μm | 15% | YES | YES | YES |

-continued

| Example No. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 30 | Polyamide 6 | 15% | 100 μm | 15% | YES | YES | YES |
| 31 | Polyamide 12 | 15% | 45 μm | 15% | YES | YES | YES |
| 32 | ABS | 15% | 45 μm | 15% | YES | YES | YES |
| 33 | TPU | 15% | 100 μm | 15% | YES | YES | YES |
| 34 | PLA | 15% | 100 μm | 15% | YES | YES | YES |
| 35 | Rigid PVC | 15% | 100 μm | 15% | YES | YES | YES |
| 36 | Plasticized PVC | 15% | 100 μm | 15% | YES | YES | YES |

The substrates used mentioned in the following examples are polymer specimens obtained by hot plate pressing of the corresponding elastomer after having added thereto the proposed material in a Banbury-type closed mixer. The elastomers have been vulcanized by means of conventional accelerator systems known in the state of the art for rubbers by means of adding 2.8 phr sulfur, 0.3 phr mercaptobenzothiazole, 0.9 phr mercaptobenzothiazole disulfide, 3.5 phr zinc oxide, 1 phr stearic acid, 0.5 phr tetramethylhydroquinoline polymer, 10 phr naphthenic process oil and 20 phr kaolin. This was done for the peroxide-crosslinked silicon by means of adding 2% dichlorobenzoylperoxide and for the platinum-cured silicone by means of adding divinyltetramethyldisiloxane platinum complex. Once specimens have been obtained, they are trimmed down to a 2 mm×2 mm×1 mm high square and tested in the four types of detectors:

| Example No. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 37 | NBR | 15% | 100 μm | 15% | YES | YES | YES |
| 38 | SBR | 15% | 45 μm | 15% | YES | YES | YES |
| 39 | SBR | Material prepared according to Example R3 | 100 μm | 15% | YES | YES | YES |
| 40 | Chloroprene Rubber | 15% | 100 μm | 15% | YES | YES | YES |
| 41 | EPDM | 15% | 45 μm | 15% | YES | YES | YES |
| 42 | Peroxide-crosslinked silicone | 15% | 100 μm | 15% | YES | YES | YES |
| 43 | Platinum-crosslinked silicone | 15% | 100 μm | 15% | YES | YES | YES |

The substrates used mentioned in the following examples are polymer specimens obtained by mold casting the corresponding thermostable polymer after having added thereto the proposed material. Unsaturated polyester-type thermostable polymers and epoxy vinyl ester have been crosslinked by means of conventional accelerator and catalyst systems known in the state of the art by adding 0.2% cobalt naphthenate accelerator and 1% methyl isobutyl ketone peroxide. Once specimens have been obtained, a 2 mm×2 mm×1 mm high square is obtained and tested in four types of detectors:

| Example No. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 44 | Epoxy 2 components cured with amines | 15% | 150 μm | 15% | YES | YES | YES |
| 45 | Orthophthalic unsaturated polyester | 15% | 150 μm | 15% | YES | YES | YES |
| 46 | Orthophthalic unsaturated polyester | Material prepared according to Example R4 | 150 μm | 15% | YES | YES | YES |
| 47 | Isophthalic unsaturated polyester | 15% | 150 μm | 15% | YES | YES | YES |
| 48 | Epoxy vinyl ester | 15% | 150 μm | 15% | YES | YES | YES |

The substrates used mentioned in the following examples are polymer specimens obtained by mold casting the corresponding thermostable polymer. First it is added thereto. Furthermore, in this case 2% methacryloxypropyltrimethoxysilane was added, then the proposed iron-silicon alloy is added. The material is mixed and the thermostable polymer has been crosslinked by means of conventional accelerator and catalyst systems known in the state of the art by adding 0.2% cobalt naphthenate and 1% methyl isobutyl ketone peroxide. Once specimens have been obtained, a 2 mm×2 mm×1 mm high square is obtained and tested in four types of detectors:

| Example No. | Polymer | Type of alloy as per Si content | Maximum particle size | % amount added to the polymer and other additives | ThermoFisher APEX100 metal detector | CEIA THS/FBB metal detector | Technik TXR Series 2480 X-ray detector |
|---|---|---|---|---|---|---|---|
| 49 | Orthophthalic unsaturated polyester | 15% | 100 μm | 15% | YES | YES | YES |

The density-based separation of the organic polymers is performed by means of directly floating the polymer in water. Polymer specimens having a size of 10 mm×10 mm×2 mm thick with or without a content of the materials provided in this invention are manufactured and placed in a tank with water such that they are separated based on whether or not the specimens float in water.

| Example No. | Polymer | Type of alloy as per Si content | Maximum particle size | % amount added to the polymer and other additives | Flotation on water |
|---|---|---|---|---|---|
| 50 | High-density polyethylene | — | 100 μm | 0% | YES |
| 51 | Polypropylene | — | 100 μm | 0% | YES |
| 52 | Polystyrene | — | 100 μm | 0% | YES |
| 53 | High-density polyethylene | 15% | 100 μm | 10% | NO |
| 54 | Polypropylene | 15% | 100 μm | 10% | NO |
| 55 | Polystyrene | 15% | 100 μm | 10% | NO |

The invention claimed is:

1. A method for providing a property to objects, or fragments thereof, manufactured using thermoplastic polymers, thermostable polymers or elastomers, wherein the property is being detectable or separable by magnetic, electromagnetic, electrical, X-ray or density-based processes, the method comprising preparing a mixture of at least two components:
   a) an organic polymer, selected from thermoplastic polymer, thermostable polymer or elastomer;
   b) an iron and silicon alloy which can contain other chemical elements in maximum proportions equal to the silicon content in the alloy, wherein the other chemical elements are selected from Cr, Ni, Co, Mo, Ti, Al, Mg, Ca, Sr, Ba, B, C, P, S, Cu, Zn, Zr, Nb, Sn, Ta, W, Bi, Ce, La, or rare earths and mixtures thereof, which has a silicon content between 5 and 50%, and which has a shape selected from spherical, prismatic, non-spherical, or non-prismatic,
   wherein the iron and silicon alloy is added to the organic polymer in amounts between 1.5% and 50%,
   wherein mixing of the thermoplastic polymer, thermostable polymer or elastomer and the iron and silicon alloy comprises:
   mixing solids with solids,
   mixing solids with molten polymers by melt mixing or extrusion,
   mixing powders with elastomeric polymers in a closed mixer by loading in a roller mill or in a roller calender, or
   mixing powders with liquids, wherein the liquid is an organic resin having one or two components, and
   wherein once the iron and silicon alloy has been added to the organic polymer, shape can be imparted to the final manufactured object.

2. The method according to claim 1, wherein the polymers can be: polyolefins selected from polyethylene, polypropylene, polybutylene, co-polymers with different monomers, EVA co-polymers, ethylene-butylmethacrylate or others, polystyrenes, PVC and vinyl plastics, PET, polymethacrylates, polyacrylates, polyamides, PLA, PVDF, polytetrafluoroethylene, polycarbonates, ABS, polyurethanes, natural rubber, SBR, NBR, chloroprene, EPDM, polybutadiene, butyl rubbers, silicones, acrylic rubbers, ionomers, epoxy resins, unsaturated polyester, epoxy vinyl ester, gel coats of the two aforementioned components, acrylic gel coats, polyurethane gel coats, polyurethane resins, polyurea resins, urea-formaldehyde, melamine-formaldehyde, or phenol-formaldehyde, and mixtures thereof, or other organic polymers.

3. The method according to claim 1, wherein the iron and silicon alloys have a silicon content which can range between 12 and 20%.

4. The method according to claim 1, wherein the iron and silicon alloys have a size between 30 μm and 110 μm.

5. The method according to claim 1, wherein the iron and silicon alloys are added in amounts which can range between 3% and 20%.

6. The method according to claim 1, wherein the iron and silicon alloys have been surface-treated or functionalized by silanes which can be one of the following or the mixture of several of the following:
   silanes of formula (1):

$$A\text{-}Si(R^2)_x(OR^1)_{3-x} \qquad (1)$$

wherein:
   $R^1$, as well as $R^2$, independently from one another, represent a linear or branched alkyl group with 1 to 4 carbon atoms,
   x is equal to 0 or 1, and
   A represents a functional group selected from the group consisting of: vinyl, propyl vinyl, 2-(3,4-epoxycyclohexyl)ethyl, 1-glycidyloxymethyl, 2-glycidyloxyethyl, 3-glycidyloxypropyl, 3-glycidyloxyisobutyl, mercaptopropyl, thiocyanatepropyl, ureidopropyl, isocyanatepropyl, methacryloxypropyl, acryloxypropyl, a linear or branched alkyl group with 1 to 50 carbon atoms, a cycloalkyl group which can be branched, a phenyl group, a phenylalkyl group with linear or branched alkyl chains between 1 to 50 carbon atoms, or an amino functional group of formula (1a)

$$-(CH_2)_f-[NH(CH_2)_g]_{g}NH[(CH_2)_f*NH]_{g*}-(CH_3) \qquad (1a),$$

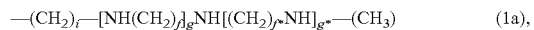

wherein i, f, f*, g or g* are identical or different, with i=1, 2, 3 or 4, f and/or f*=1 or 2, g and/or g*=0 or 1; or
   Bis-aminosilanes of formula (2):

$$(OR_1)_3Si\text{-}A\text{-}Si(OR_1)_3 \qquad (2)$$

wherein:
   the $R^1$ groups are identical or different and $R^1$ represents a linear or branched alkyl group with 1 to 4 C atoms, and
   A represents a bis-amino functional group of formula (2a):

$$-(CH_2)_f-[NH(CH_2)_g]_{g}NH[(CH_2)_f*NH]_{g*}-(CH_2)_{i*} \qquad (2a)$$

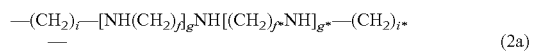

i, i*, f, f*, g or g* are identical or different, with i and/or i*=1, 2, 3 or 4, f and/or f*=1 or 2, g and/or g*=0 or 1,
   a polysulfine group (2b):

$$-(S)_i- \qquad (2b)$$

i can take values of 1 to 10; or
   an alkyl chain with 1 to 50 carbon atoms.

7. The method according to claim 6, and wherein the ratio of silane to iron and silicon alloys can be between 0.01 and 10% when added by mass/mass percentage.

8. The method according to claim 7, wherein the treatment of the surface of the iron and silicon alloys with a silane, when the same are in the solid state, is performed by means of adding a liquid medium containing silane.

9. The method according to claim 7, wherein the treatment of the surface of the iron and silicon alloys with a silane, when the same are in the solid state, is performed by means of adding a gaseous medium containing silane.

10. The method according to claim 7, wherein the treatment of the surface of the iron and silicon alloys with a silane is performed during the mixing with the polymer to which the silane has been added.

11. The method according to claim 1, wherein shaping the final manufactured object comprises using injection, extrusion, coextrusion, manufacture of fibers, rotational molding, pressing, hot plate pressing, open molding, casting, sintering, film, manufacture of fibers, SMC, BMC, or rolling to make the articles.

12. A method of which the iron and silicon alloys are added to the polymers according to claim 1 for allowing the detection of thermostable polymers, thermoplastic polymers, elastomers or fragments thereof present in other products selected from foods, medicinal products, materials, or powders for industrial use, liquids or others.

13. A method of which the iron and silicon alloys are added to the polymers according to claim 1 for allowing the detection of pipes, conduits, catch basins or structures manufactured in thermoplastic polymers, thermostable polymers or elastomers which are underground or difficult to access.

14. A method of which the iron and silicon alloys are added to the polymers according to claim 1 for allowing the separation of different thermoplastic polymers, thermostable polymers or elastomers or for the separation of the latter from other materials by detection of the presence thereof or by separation based on different density.

* * * * *